United States Patent

Peruski

[15] 3,645,269
[45] Feb. 29, 1972

[54] THRESHING MACHINE
[72] Inventor: Henry C. Peruski, M-19, Ubly, Mich. 48475
[22] Filed: Apr. 7, 1970
[21] Appl. No.: 26,219

[52] U.S. Cl. ..........................................130/27 JT
[51] Int. Cl. ..........................................A01f 12/00
[58] Field of Search.....................130/27 R, 27 JT

[56] References Cited

UNITED STATES PATENTS

| 2,528,232 | 10/1950 | Krause | 130/27 JT |
| 2,812,766 | 11/1957 | Goffnett | 130/27 JT |
| 2,959,175 | 11/1960 | Oberholtz et al. | 130/27 JT |

*Primary Examiner*—Antonio F. Guida
*Attorney*—Berman, Davidson & Berman

[57] ABSTRACT

A threshing machine in which pressure vibrator fingers are positioned beneath a conventional rotatable threshing cylinder for cooperation therewith to thresh grain. The fingers are mounted so that a rock coming in contact therewith will cause the fingers to move downwardly permitting the rock to fall to a lower conveyor without damage to the threshing machine. The fingers may be restored to threshing position by the actuation of a manually controlled lever from the operator's station.

8 Claims, 10 Drawing Figures

INVENTOR.
HENRY C. PERUSKI,
BY
Berman, Davidson & Berman,
ATTORNEYS.

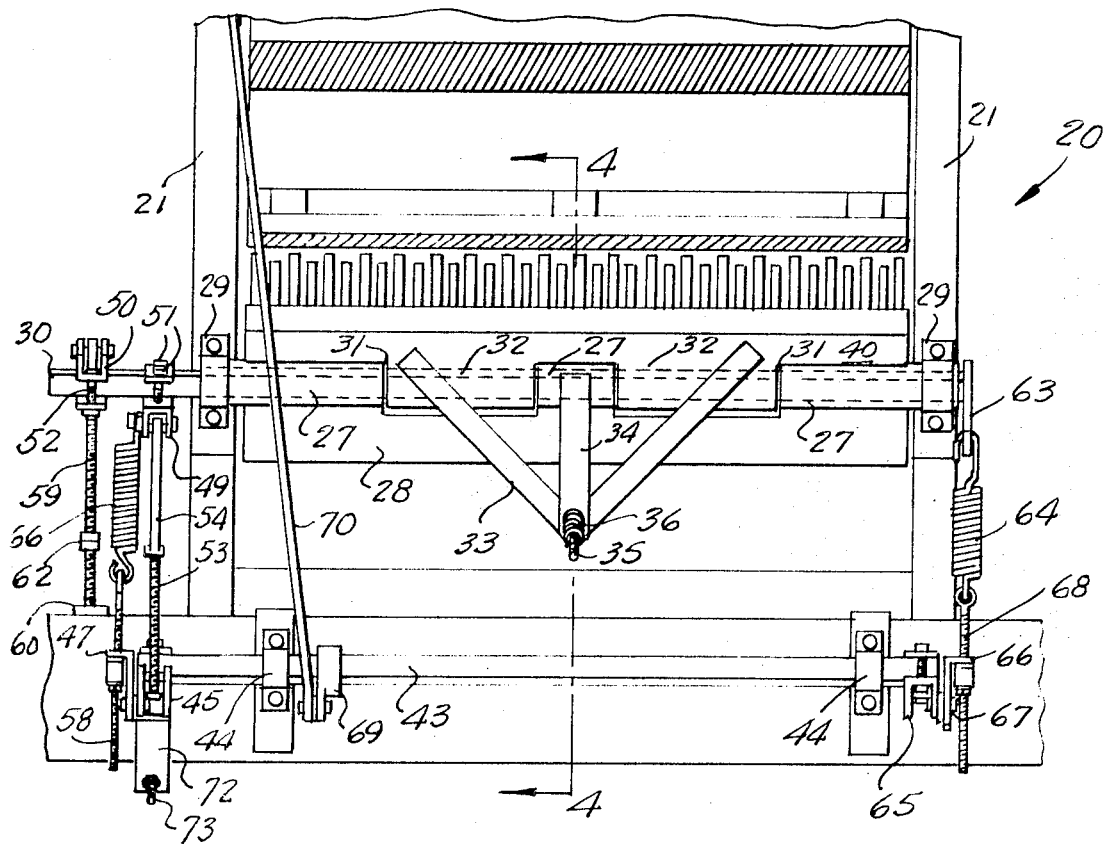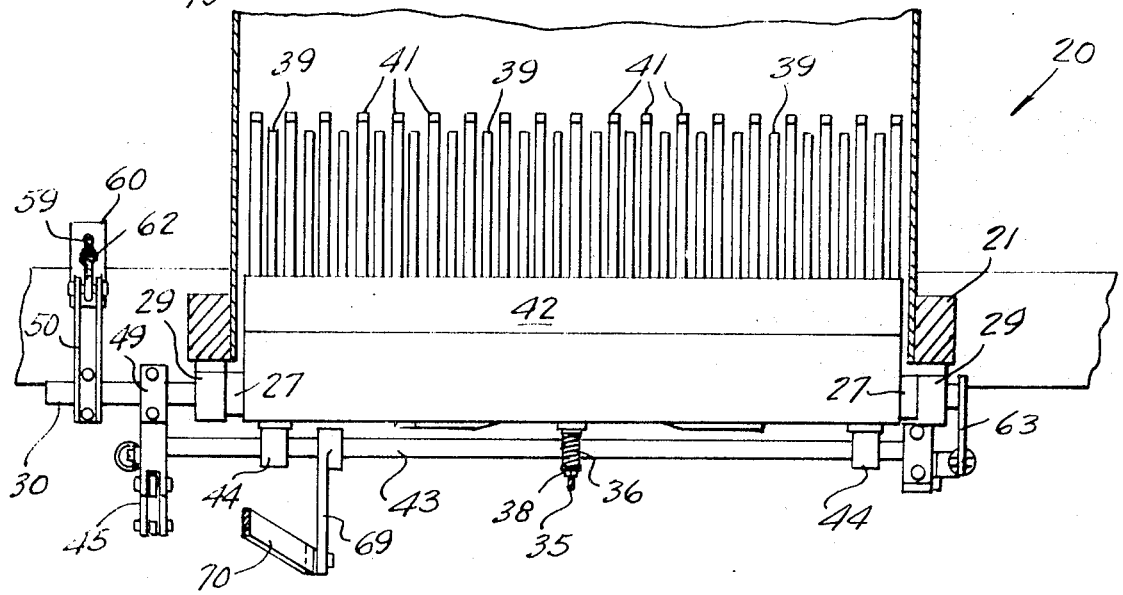

INVENTOR.
HENRY C. PERUSKI,
BY
Berman, Davidson & Berman,
ATTORNEYS.

INVENTOR.
HENRY C. PERUSKI,

3,645,269

THRESHING MACHINE

BACKGROUND OF THE INVENTION

Field of the Invention

The present invention relates to threshing machines of the type utilizing a conventional rotatable threshing cylinder.

SUMMARY OF THE INVENTION

The threshing machine of the instant invention incorporates pressure vibrator fingers which are mounted beneath and cooperate with the threshing cylinder to thresh grain. The vibrator fingers are mounted so as to be released from threshing position to permit the passage of a rock thru the threshing machine without damage thereto. A manually controlled lever actuated by the operator is provided for restoring the vibrator fingers to threshing position.

The primary object of the invention is to provide a rock release for threshing machines to permit the passage of a rock therethrough without damage to the machine.

Other objects and advantages will become apparent in the following specification when considered in the light of the attached drawings.

BRIEF DESCRIPTION OF THE DRAWINGS

FIG. 2 is a fragmentary sectional view taken along the line 2—2 of FIG. 1 looking in the direction of the arrows;

FIG. 3 is a fragmentary horizontal section taken along the line 3—3 of FIG. 1 looking in the direction of the arrows;

DESCRIPTION OF THE PREFERRED EMBODIMENT

Figure 1:
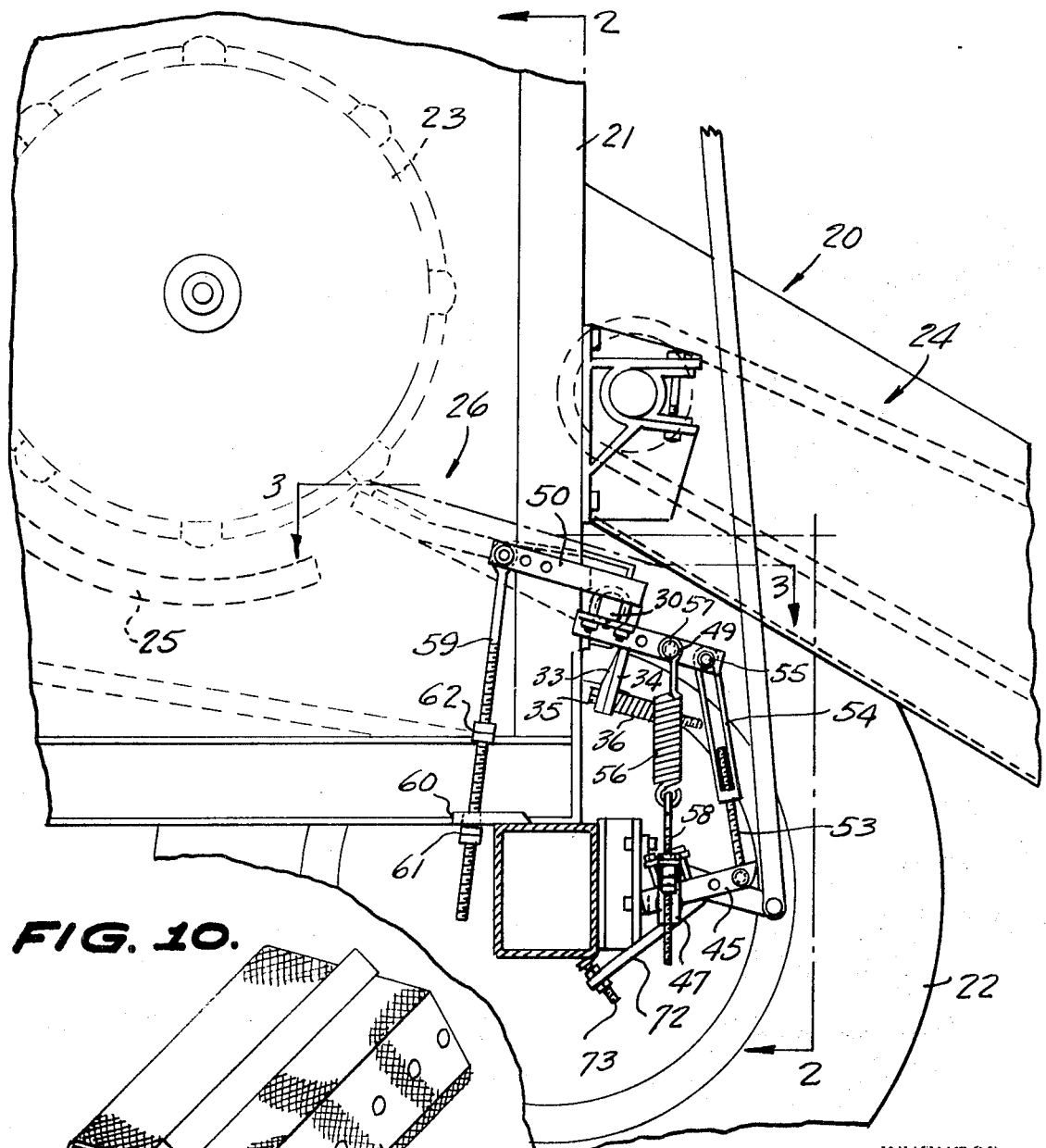
FIG. 1 is a side elevation of the invention shown partially broken away and in section for convenience of illustration.

Referring now to the drawings in detail wherein like reference characters indicate like parts throughout the several figures the reference numeral 20 indicates generally a threshing machine constructed in accordance with the invention.

The threshing machine 20 includes a frame 21 supported on ground-engaging wheels 22 and having threshing cylinder 23 mounted for rotation on the frame 21. A grain conveyor generally indicated at 24 is positioned to feed cut grain while being threshed by the threshing cylinder 23. The frame 21, wheels 22, threshing cylinder 23, grain conveyor 24, and concave 25 are all of conventional construction and similar structures may be seen in U.S. Pat. Nos. 3,209,760 and 3,215,145.

To install the pressure vibrator fingers generally indicated at 26 a portion of the conventional concave 25 immediately to the rear of the conveyor 24 are removed to allow space for the fingers 26.

The pressure vibrator finger system 26 includes a tubular shaft 27 secured to a transversely extending angle iron 28 and journaled bearings 29 mounted on frame 21.

A square shaft 30 is mounted for rotation in tubular shaft 27 and extends substantially beyond the frame 21 at one side thereof. The tubular shaft 27 has a pair of spaces 31 formed therein to receive a pair of stub tubular shaft members 32. The stub tubular shaft members 32 have square axial bores which fit the square shaft 30 to cause the shaft members 32 to turn with the square shaft 30. The tubular shaft 27 rotates freely on the square shaft 30. A triangular bracket 33 is secured to the stub tubular shaft members 32 and a bracket arm 34 is secured to the center portion of the tubular shaft 27. Triangular bracket 33 and the bracket arm 34 are arranged in generally parallel relation and in contact at their free ends.

A bolt 35 extends thru the triangular bracket 33 and thru the bracket arm 34 and carries a compression coil spring 36 thereon in engagement with the bracket arm 34. A washer 37 and a nut 38 secure the bolt 35 in position so that the triangular bracket 33 and the bracket arm 34 are held by the spring 36 in contact with each other when at rest. A plurality of generally straight fingers 39 are welded to the angle iron 28 and extends in spaced parallel relation forwardly therefrom. An angle iron frame 40 is secured to the stub shafts 32 and extends transversely of the thresher 20 generally parallel to the angle iron 28. A plurality of fingers 41 are welded to the angle iron frame 40 and extend forwardly therefrom in spaced apart parallel relation. The fingers 41 have an upwardly offset forward end portion and are arranged intermediate the fingers 39 in spaced apart parallel relation thereto. A cover plate 42 extends transversely of the thresher 20 and is secured to the angle iron frame 40 overlying the fingers 41 and in contact therewith.

A square shaft 43 extends transversely of the threshing machine 20 and is mounted for rotation in a pair of bearings 44 secured to the frame 21. The shaft 43 is positioned substantially below and generally parallel to the shaft 30. A bracket 45 is secured to one end of the square shaft 43 by means of a clamp plate 46 and an angle bracket 47 is secured to the bracket 45 by a bolt 48.

A pair of oppositely extending brackets 49, 50 are secured to the square shaft 30 by volts 51, 52 respectively.

A bolt 53 is pivotally mounted in the rear end of the bracket 45 and extends upwardly thereon having a U-shaped nut member 54 threaded thereon. A U-shaped nut member 54 is mounted on a pin 55 carried by rear end of bracket 49. A tension coil spring 56 is mounted on a pin 57 carried by the bracket 49 and extends downwardly therefrom. The lower end of the spring 56 is secured to a bolt 58 adjustably secured to the angle bracket 47 at its lower end.

A bolt 59 is carried by the forward end of the bracket 50 and extends downwardly therefrom thru an apertured plate 60 secured to the frame 21. The bolt 59 has a pair of jam nuts 61 which limit the upward movement of the bolt 59 with respect to the plate 60 and a second pair of jam nuts 62 which limit the downward movement of the bolt 59 with respect to the plate 60.

A bracket arm 63 is secured to the end of the square shaft 30 opposite the bracket 49 and a tension coil spring 64 is secured thereto. A channel bracket 65 is secured to the end of the square shaft 43 opposite the bracket 45 and has an angle bracket 66 secured thereto by a bolt 67. A bolt 68 is secured to the lower end of the spring 64 and is adjustably secured to the angle bracket 66 corresponding to bolt 58 and its connection to the angle bracket 47.

An arm 69 is mounted on the square shaft 43 to turn therewith. A lever 70 is attached to the end of the arm 69 by a pivot bolt 71 so that movement of the lever 70 will move the arm 69 and rotate the square shaft 43 in the bearings 44.

Figure 4:
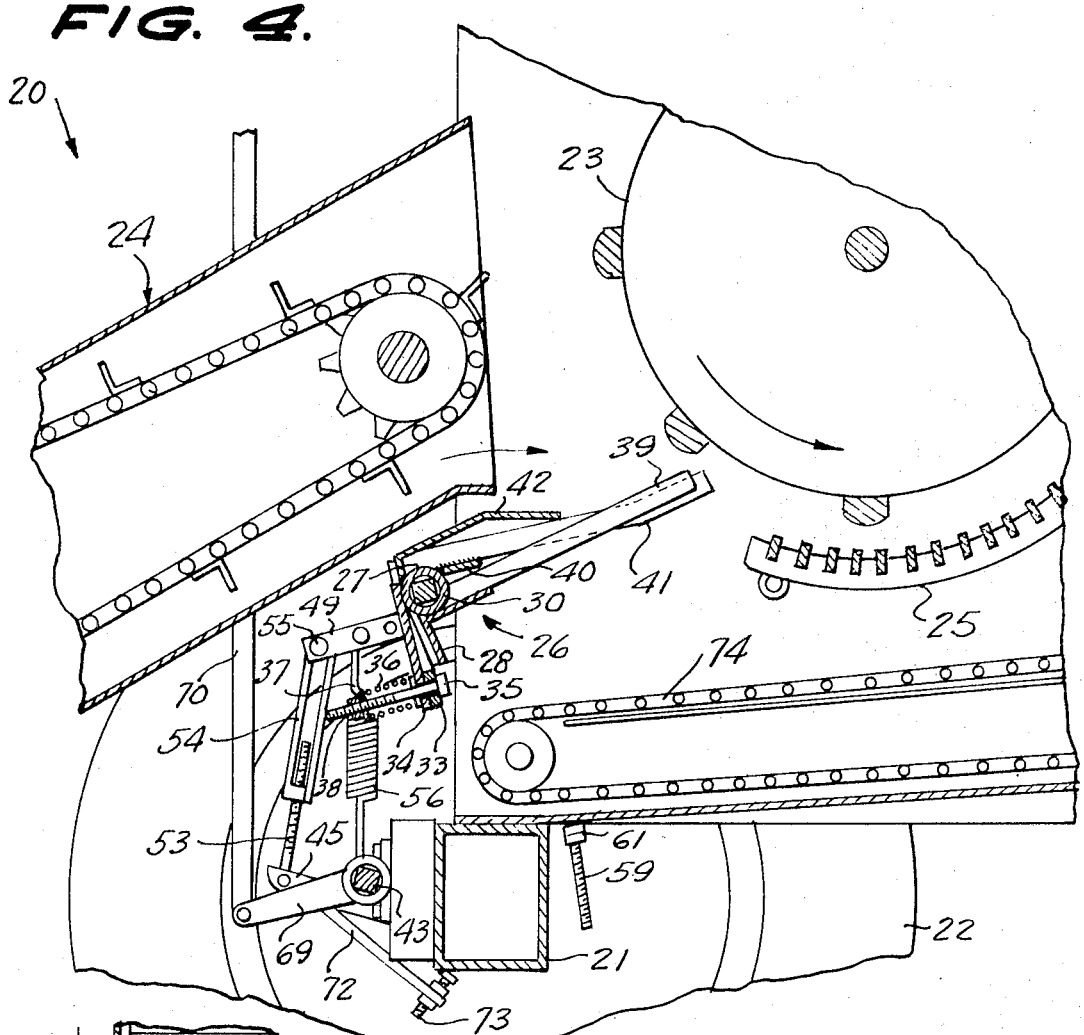
FIG. 4 is a fragmentary longitudinal section taken along the line 4—4 of FIG. 2 looking in the direction of the arrows.

In the use and operation of the invention as illustrated in FIGS. 1 thru 6 the pressure vibrator finger attachment generally indicated at 26 is normally positioned as illustrated in FIGS. 1 and 4 with the fingers 39, 41 having their outer ends closely adjacent the threshing cylinder 23. Grain moving up the conveyor 24 passes between the vibrator fingers 39 and 41 and the threshing cylinder 23 and as the threshing cylinder 23 rotates the fingers 39, 41 vibrate due to the action of the threshing cylinder 23 on the grain and thus on the fingers 39, 41 so as to thresh the seed from the head of the stalks. The fingers 39, 41 may vibrate with respect to each other by compression of the spring 36 when the fingers 39 move down with respect to the fingers 41. By adjusting the nut 38 the fingers 39, 41 can be individually lowered or raised to suit the threshing action to the needs of differing crops. The triangular bracket 33 and the bracket arm 34 will open scissor like, allowing pressure vibrator fingers 39 to drop flush with the fingers 41. The more difficult the threshing the higher the fingers 39 with respect to the fingers 41.

An arm 72 is secured to the bracket 45 and carries an adjustable bolt 73 in its terminal end for engagement with the part of the frame 21. The height of the fingers 39 and 41 with respect to the cylinder 23 may be adjusted by movement of the nut member 54 on the bolt 53 to raise or lower the bracket 49. The adjustable bolts 73 permit a fine adjustment of the fingers 39, 41 without removing the nut member 54 from the pin 55.

Figures 7, 8, 9:
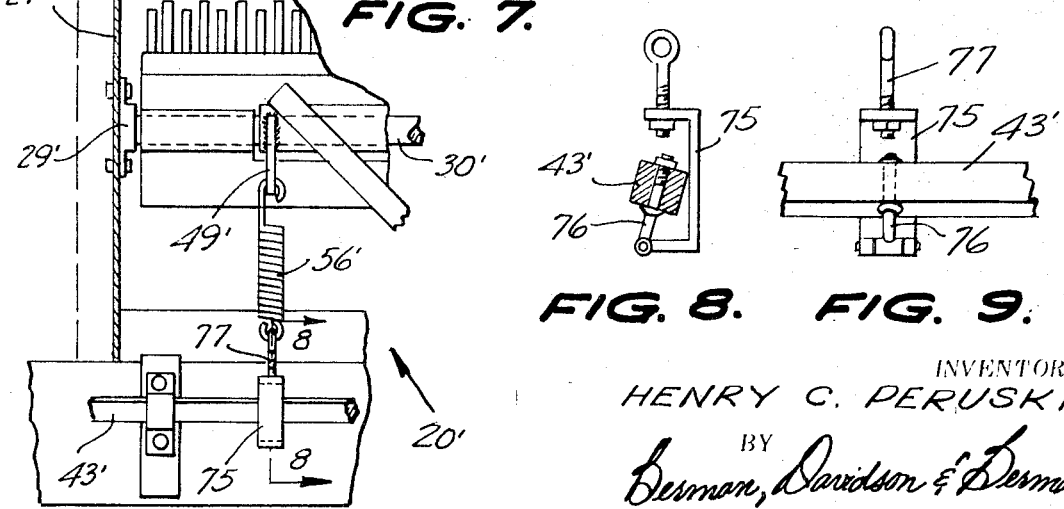
FIG. 7 is a fragmentary transverse sectional view of a modified form of the invention.
FIG. 8 is an enlarged fragmentary vertical section taken along the line 8—8 of FIG. 7 looking in the direction of the arrows.
FIG. 9 is a fragmentary elevational view of the structure illustrated in FIG. 8.
Figure 5:
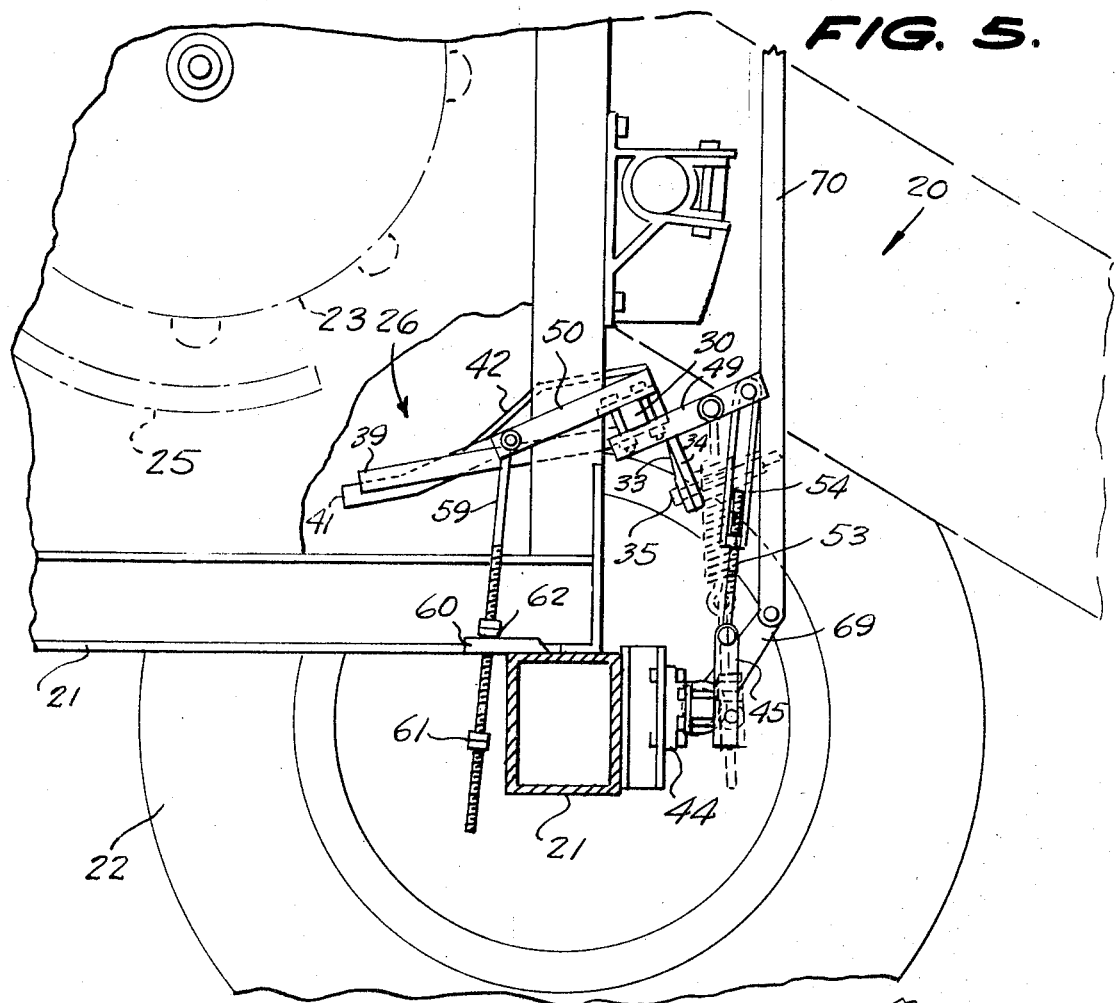
FIG. 5 is a view similar to FIG. 1 illustrating the fingers in rock-releasing position.
Figure 6:
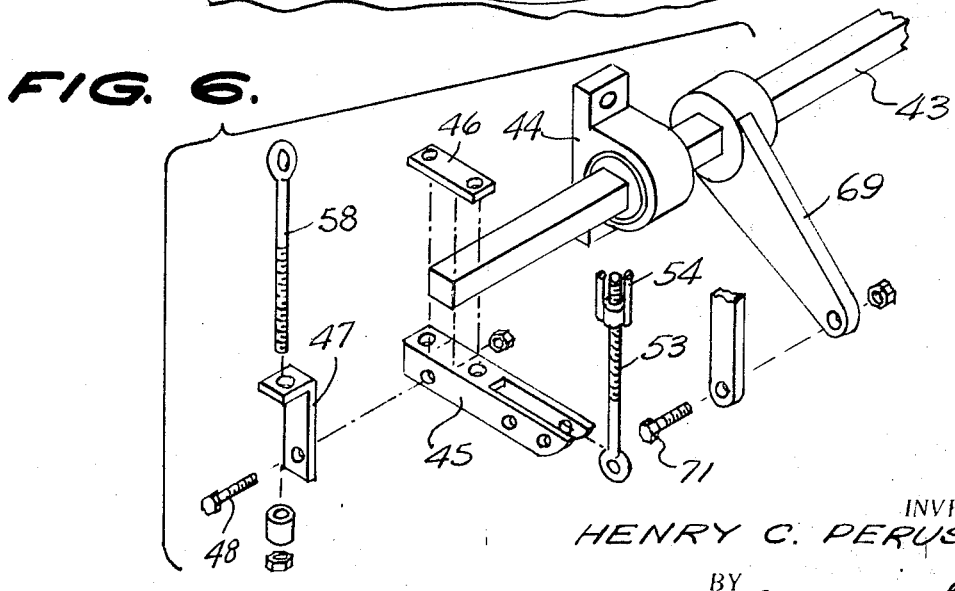
FIG. 6 is an exploded perspective view of a portion of the linkage.

When a rock of the size that could damage the threshing machine 20 is delivered by the conveyor 24 onto the fingers 39, 41 the fingers 39, 41 are forced downwardly against the tension of the coil spring 56 and the coil spring 64 and the bracket 45 and bolt 53 pass to an overhead center position so that the fingers 39, 41 remain in their lowered position to permit the rock to drop on to a conveyor 74 on a lower deck deck of the threshing machine 20. The jam nut 62 on the bolt 59 prevent the fingers 39, 41 from moving downwardly beyond the present distance. After the rock has passed over the fingers 39, 41 the operator of the threshing machine can manually actuate the lever 70 to rotate the arm 69 and thus the square shaft 43 to reset the fingers 39, 41 to threshing position where they are maintained in position by pressure of coil springs 56, 64 until another rock is encountered. In FIGS. 7, 8 and 9 a modified form of the invention is illustrated wherein a round shaft 30' replaces the square shaft 30 and is journaled in bearings 29' on the frame 21' of the threshing machine generally located at 25. A bracket 49' is welded onto the tubular stub shaft 32' and has a tension coil spring 56' secured to the outer end thereof. A channel bracket 75 is secured to the square shaft 43' by means of a tee bolt 76 which extends thru the square shaft 43' and is pivotally connected to the lower end of the channel bracket 75. An adjustable eye bolt 77 extends upwardly from the channel bracket 75 and the lower end of the coil spring 56' is connected thereto. The remaining structure of the modification illustrated in FIGS. 7 thru 9 is identical to that of the preferred form of the invention and the operation is identical to that of the preferred form of the invention as described above.

Figure 10:
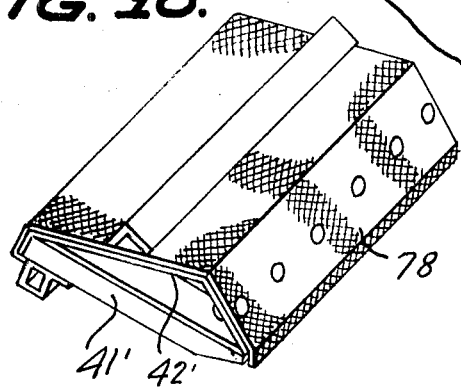
FIG. 10 is a fragmentary perspective view of another modified form of the invention.

In FIG. 10 another modified form of the invention is illustrated for replacement of the fingers 41 for threshing clover.

The fingers 41' are mounted on the square shaft 30 of the preferred form of the invention in place of the fingers 41 and have a rubber mat 78 supported on a cover 42' with the rubber mat 78 cooperating with the threshing cylinder 23 when threshing clover.

The operation of the modification illustrated in FIG. 10 is identical to the operation of the preferred form of the invention.

Having thus described the preferred embodiment of the invention it should be understood that numerous structural modifications and adaptations may be resorted to without departing from the spirit of the invention.

What is claimed is:

1. In a threshing machine of the type including a frame, a threshing cylinder mounted for rotation in said frame, and means for feeding grain to said threshing cylinder for threshing thereby, the improvement comprising a plurality of spaced-apart parallel pressure vibrator fingers mounted in said frame for cooperation with said threshing cylinder to thresh grain passing therebetween, resilient releasable means for supporting said fingers in threshing position at the mounting end only of said fingers and hand-actuated means for returning said fingers to threshing position.

2. A device as claimed in claim 1 wherein said fingers include two se sets of spaced-apart parallel fingers and means for mounting said sets of fingers for vibrator movement with respect to each other.

3. A device as claimed in claim 1 wherein a rubber clover threshing mat is secured to said fingers and moves therewith.

4. A device as claimed in claim 1 wherein a square shaft is journaled for rotation with respect to said frame and said fingers are mounted on said square shaft.

5. A device as claimed in claim 1 wherein the resilient means supporting said fingers in threshing position with respect to said threshing cylinder includes adjustably mounted resilient springs.

6. A device as claimed in claim 1 wherein means are provided on the means mounting said fingers for limiting the movement of said fingers toward said threshing cylinder and away from said threshing cylinder.

7. A device as claimed in claim 6 wherein said last named means is adjustable.

8. A device as claimed in claim 2 wherein the means mounting said sets of fingers for vibratory movement with respect to each other includes a manually adjustable coil spring mounting.

* * * * *